United States Patent Office 3,043,658
Patented July 10, 1962

3,043,658
STABILISATION OF PER COMPOUNDS
Reginald Henry Banfield, Luton, England, assignor to Laporte Chemicals Limited, Luton, England, a company of Great Britain
No Drawing. Filed July 6, 1960, Ser. No. 41,004
17 Claims. (Cl. 23—166)

This invention is concerned with improvements in or relating to the stabilisation of per compounds. More particularly, it is extremely useful in the stabilisation of aqueous solutions of hydrogen peroxide and of inorganic and organic peracids such as permonosulphuric and peracetic acids.

It should be understood that this invention is therefore only concerned with certain water-soluble inorganic and organic per compounds and it should be, further, understood that the term "aqueous solutions" as used herein includes cases where the actual proportion of water in the solution may be small. Thus a mixture of 95% w./w. hydrogen peroxide and 5% w./w. water is an aqueous solution for the purposes of this invention.

Commercial processes widely employed for the preparation of hydrogen peroxide include the anodic oxidation of bisulphates or sulphuric acid with subsequent hydrolysis of the resultant persulphate or persulphuric acid followed by removal by distillation of the hydrogen peroxide formed by such hydrolysis from the hydrolysed solution. Another well-known type of process employs the oxidation of certain organic compounds. Thus, in United Kingdom specification No. 465,070 a process is described for the production of hydrogen peroxide in which an alkylated anthraquinone is hydrogenated in a solvent by means of hydrogen in the presence of a catalyst to the corresponding alkylated anthraquinol or anthraquinhydrone which, after separation from the catalyst, is oxidised with oxygen to produce hydrogen peroxide with regeneration of the alkylated anthraquinone. Such a process may be made cyclic by recycling the alkylated anthaquinone to the hydrogenation stage after the removal of the hydrogen peroxide by aqueous extraction.

Both the product of the anodic oxidation process (the electrolytic process) and that of the process relying upon the oxidation of alkylated anthraquinols are often protected from chance contamination by the addition of stabilisers. Also, certain commercial grades require the addition of such stabilisers.

This applies equally to the products derived from the process relying on the oxidation of isopropyl alcohol and from the process in which hydrazo compounds are oxidised. In consequence substances such as pyrophosphates and tin salts and certain organic substances such as phenacetin and 8-hydroxy quinoline have found wide application as stabilisers. In United Kingdom specification No. 713,156 a method is described for stabilising aqueous solutions of hydrogen peroxides by the use of pyridine carboxylic acids.

Aqueous solutions of water-soluble organic and inorganic peracids such as peracetic and permonosulphuric acids also require to be stabilised in order to prevent the loss of active oxygen.

It has been found according to this invention that tripyridyl,

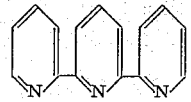

exhibits a marked stabilising effect on aqueous solutions of hydrogen peroxide and water-soluble organic and inorganic peracids, is resistive to oxidative attack, and in general possesses those characteristics desired of a good stabiliser. As will be seen later it is particularly effective in the stabilisation of hydrogen peroxide used as a rocket fuel and possesses several desirable features when used in such an application. Since tripyridyl itself is very sparingly soluble in water it is treated with an acid to form a salt and it is this salt that is added to the solution to be stabilised.

Accordingly the present invention provides an aqueous solution of hydrogen peroxide, or of an inorganic or organic peracid, stabilised with a water-soluble salt of tripyridyl. The water-soluble salt of tripyridyl may be prepared by reacting tripyridyl with an equivalent amount or slight excess of an acid. The water-soluble salt formed is added to the solution to be stabilised.

Preferably the concentration of tripyridyl in the stabilised solution is between 10 and 500 p.p.m.

Preferably the salt of tripyridyl is formed by reacting tripyridyl with a strong inorganic acid such as sulphuric acid, nitric acid, phosphoric, perchloric or hydrochloric acid. Organic acids which may be used include trifluoroacetic, salicylic and benzoic acids. These may be reacted with tripyridyl to form the salts of the acids. In addition tripyridyl acetate formed from tripyridyl and acetic acid may be used for stabilising peracetic acid.

The tripyridyl used should be as pure as possible. It is particularly important that it be free from dipyridyl since this, upon complexing with some contaminating metallic ions, forms a vigorous decomposition catalyst.

The amount of the tripyridyl added will depend upon the degree of stability required in the end product and the initial quality of the compound to be treated. Since tripyridyl is an expensive substance to produce it is particularly desirable to use as small a quantity as possible. This, however, is dependent upon the quality of the per compound initially and therefore must be determined empirically. In certain circumstances it may be possible to use other and cheaper stabilisers in conjunction with tripyridyl such as tin salts and soluble phosphates such as phosphoric acid, sodium pyrophosphate and the molecularly dehydrated phosphates, e.g. tetraphosphates and hexametaphosphates, of the alkali or alkaline earth metals.

Hydrogen peroxide in high concentration (i.e. of concentration greater than 80% w./w.) has many applications as a source of power and particularly as a rocket fuel. In the table given below the results are given of two sets of experiments in which the rate of oxygen evolution was measured at intervals from 25 mls. samples of 85–87% w./w. hydrogen peroxide at 100° C. in glass. In the first set of experiments the hydrogen peroxide was stabilised with tripyridyl sulphate whilst in the second set the hydrogen peroxide was stabilised with dipicolinic acid. As a reference, another 25 mls. sample of 85–87% w./w. hydrogen peroxide was held at 100° C. in glass. The initial rate of oxygen evolution of this latter sample when contaminated as next described was 2.2 to 2.7 mls./minute. In all the experiments the samples were contaminated with a solution containing the equivalent of 0.1 mgm. per litre of Firth Vickers Stainless Steel 254 whose approximate composition was:

| | Percent |
|---|---|
| Iron | 56.0 |
| Chromium | 18.0 |
| Nickel | 18.0 |
| Molybdenum | 3.75 |
| Copper | 2.4 |
| Manganese | 0.80 |
| Carbon | 0.07 |
| Silicon | 0.40 |

In all the experiments, before measurements were commenced, the final pH was adjusted to approximately 4 on the Wynne-Jones Scale (Trans. Farad. Soc. 1955, 1690).

| Tripyridyl (present as sulphate) (mol. weight 233), 0.15 gms./litre | | Dipicolinic acid (mol. weight 167), 0.1 gms./litre | |
|---|---|---|---|
| Time, hours | Rate, mls./min. | Time, hours | Rate, mls./min. |
| 0.25 | 0.08 | 1.0 | 0.05 |
| 3.0 | 0.08 | 2.0 | 0.06 |
| 5.5 | 0.06 | 5.0 | 0.035 |
| 20.5 | 0.04 | 21.0 | 0.032 |
| 22.0 | 0.03 | 25.0 | 0.038 |
| 28.5 | 0.03 | 30.0 | 0.039 |
| 33.0 | 0.03 | 45.0 | 0.053 |
| 48 | 0.03 | 59 | 14.0 |

It will be observed that the weights of stabiliser used in these two cases were approximately proportional to their molecular weights. Comparison of these results shows a slight advantage using tripyridyl as against dipicolinic acid. However, when hydrogen peroxide (85% w./w. $H_2O_2$) was tested on a silver wire decomposer the superiority of tripyridyl as compared with dipicolinic acid was most marked. In such a use of hydrogen peroxide vigorous activity is required with minimum silver loss. The results of passing 85% w./w. $H_2O_2$ over the decomposer at 30 mls./min. were as follows:

| Sample | Steady activity rate of oxygen evolution mls./min from 1 cm.² Ag surface | Rate of Ag loss in mgms. per hour from 1 cm.² Ag surface | Molecules of $H_2O_2$ decomposed per atom of Ag dissolved |
|---|---|---|---|
| Blank (non-stabilised) | 525 | 42 | 6,630 |
| Stabilised with 0.05 gms./litre tripyridyl (present as sulphate) | 665 | 86 | 4,100 |
| Stabilised with 0.08 gms./litre dipicolinic acid | 100 | 208 | 2.5 |

It is seen that not only is the activity low in the case of the hydrogen peroxide stabilised with picolinic acid but also that the number of molecules of hydrogen peroxide decomposed per atom of silver corroded is extremely low in comparison with the number achieved with tripyridyl.

In other words, comparable stabilisation of high test peroxide is obtained using either tripyridyl or dipicolinic acid but that hydrogen peroxide stabilised with the former is much to be preferred where the peroxide is to be used as a rocket fuel.

By comparing the activity and silver loss figures for the tripyridyl-sulphate stabilised solution and the blank solution it will be seen that the former solution gives rise to a 25% increase in activity of oxygen evolution, although this is accompanied by a doubling of the rate of silver loss. It is repeated however, that this high test peroxide finds a very important application as a rocket fuel and in this sphere at least the increase in activity is most desirable and more than fully offsets the accompanying increase in silver loss since this latter is still within tolerable limits.

A further important advantage obtained by stabilising hydrogen peroxide of high concentration with a stabiliser according to the present invention will be seen from the Example III described hereafter.

The following two examples illustrate, in Example I, the stabilisation of peracetic acid and, in Example II the stabilisation of permonosulphuric acid.

*Example I*

Three experiments were carried out using an aqueous peracetic acid solution, the content of peracetic acid being 38–40% w./w. The rates of oxygen evolution in mls./litre/hour at 40° C. were:

Blank (non-stabilised) _____ 54
0.1 gms./litre tripyridyl (present as sulphate) _____ 33
0.2 gms./litre tripyridyl (present as sulphate) _____ 37

*Example II*

Three experiments were carried out using an aqueous permonosulphuric acid solution, the content of permonosulphuric acid being 10% w./w. The rates of oxygen evolution in mls./litre/hour at 40° C. were:

Blank (non-stabilised) _____ 4.6–6.0
0.1 gms./litre tripyridyl (present as sulphate) ___ 2.0
0.2 gms./litre tripyridyl (present as sulphate) ___ 1.3

The following example illustrates the effect of tripyridyl sulphate on the stabilisation of a solution of hydrogen peroxide which already contains another stabilising agent.

*Example III*

The following experiment was carried out with 86% w./w. hydrogen peroxide. Two one-gallon polyethylene bottles were each filled with 86% w./w. hydrogen peroxide. To each bottle was then added 3 mgm./litre of tin as sodium stannate—a known stabiliser for hydrogen peroxide. To the second bottle only was also added 100 mgm./litre of tripyridyl as the sulphate. The final pH value of each solution was adjusted to 5.8 (Wynne-Jones Scale).

Each bottle was then closed with a cap having a small bore tube leading to a gas burette and the whole unit maintained at a constant ambient temperature of 25° C. for 300 days. The oxygen evolved in each case was measured at regular intervals throughout the whole period. From the total oxygen evolved it was calculated that the loss of original $H_2O_2$ in the first bottle was 0.08%, whilst in the second bottle (that to which the tripyridyl sulphate had been added) the loss was only 0.03%.

This is a remarkable improvement in the stability of what is clearly an already stable solution.

The significance of the increased stability brought about by the tripyridyl sulphate addition is that it brings at least to within the threshold of possibility the lengthy storage of hydrogen peroxide of high concentration in sealed containers. The desirability of this is unquestionable, the difficulty heretofore has been the danger due to unpredictable bursting of the containers due to evolution of oxygen. The above experiment showed that a reduction in evolution of over 60% is possible by combination of the known stabiliser and a stabiliser in accordance with the present invention.

What I claim is:

1. An aqueous solution of a peroxy compound selected from the group consisting of hydrogen peroxide, organic peracids and inorganic peracids, stabilised with a water-soluble salt of tripyridyl.

2. An aqueous solution of a peroxy compound selected from the group consisting of hydrogen peroxide, organic peracids and inorganic peracids, stabilised with tripyridyl sulphate.

3. An aqueous solution of a peroxy compound selected from the group consisting of hydrogen peroxide, organic peracids and inorganic peracids, stabilised with tripyridyl nitrate.

4. An aqueous solution of a peroxy compound selected from the group consisting of hydrogen peroxide, organic peracids and inorganic peracids, stabilised with tripyridyl hydrochloride.

5. An aqueous solution of a peroxy compound selected from the group consisting of hydrogen peroxide, organic peracids and inorganic peracids, stabilised with tripyridyl phosphate.

6. An aqueous solution of a peroxy compound selected from the group consisting of hydrogen peroxide, organic peracids and inorganic peracids, stabilised with tripyridyl perchlorate.

7. An aqueous solution according to claim 1, wherein the water-soluble salt of tripyridyl is present present in an amount of from 10 to 500 p.p.m.

8. An aqueous solution according to claim 1, wherein at least one other stabiliser is present in addition to the water-soluble tripyridyl salt.

9. An aqueous solution according to claim 8, wherein said additional stabiliser is a water-soluble salt of tin.

10. An aqueous solution of hydrogen peroxide having a hydrogen peroxide concentration greater than 80 percent w./w. and stabilised with a water-soluble salt of tripyridyl.

11. An aqueous solution of hydrogen peroxide as claimed in claim 10, wherein the water-soluble salt is present in an amount of from 10 to 500 p.p.m.

12. An aqueous solution of permonosulphuric acid stabilised with a water-soluble salt of tripyridyl.

13. An aqueous solution of peracetic acid stabilised with a water-soluble salt of tripyridyl.

14. An aqueous solution of hydrogen peroxide stabilised with a water-soluble salt of tripyridyl.

15. An aqueous solution as claimed in claim 14, wherein the water-soluble tripyridyl salt is present in an amount of from 10–500 p.p.m.

16. An aqueous solution of peracetic acid stabilised with from 10 to 500 p.p.m. of tripyridyl acetate.

17. An aqueous solution of hydrogen peroxide, stabilised with from 10 to 500 p.p.m. of tripyridyl sulphate.

References Cited in the file of this patent

UNITED STATES PATENTS 2,783,132    Panepinto _____ Feb. 26, 1957

FOREIGN PATENTS 523,710    Canada _____ Apr. 10, 1956
821,355    Great Britain _____ Oct. 7, 1959

OTHER REFERENCES

Rodd: "Chemistry of Carbon Compounds," vol. IV, part A, page 565, Elsevier Publ. Co., 1957.